Dec. 3, 1968   K. W. COWANS   3,413,802
REGENERATOR STRUCTURE
Filed Sept. 13, 1967

INVENTORS.
KENNETH W. COWANS,
BY
ATTORNEY.

3,413,802
REGENERATOR STRUCTURE
Kenneth W. Cowans, Los Angeles, Calif., assignor to Hughes Aircraft Company, Culver City, Calif., a corporation of Delaware
Filed Sept. 13, 1967, Ser. No. 667,423
6 Claims. (Cl. 60—24)

ABSTRACT OF THE DISCLOSURE

The disclosed structure has particular utility in closed cycle reciprocating refrigerators and engines. A hot cylinder is provided having an internal annular mandrel with grooves spirally arranged about the outer circumference. An annularly finned rod is spirally disposed within the mandrel grooves to surround the mandrel and project thereabove. The cylinder also comprises a cap press-fitted over the finned rod. A regenerator space is thus provided between the cap and the telescopically received mandrel. Fluid circulates from the hot cylinder through the space and over the finned rod. The rod acts as a regenerator absorbing and returning heat to the circulating fluid as a thermodynamic cycle proceeds.

---

The invention is directed to a regenerator structure having particular utility in effectively capturing and returning heat to a thermodynamic process utilizing a circulating fluid such as refrigerators and engines.

Heat exchange engines and refrigerators requiring heat exchange cycle are becoming more practical as equipment utilizing such thermodynamic cycles becomes more refined and highly developed. For example, the well known Stirling cycle has recently been used as a mode of powering virtually noiseless engines without the need of an internal combustive effect of a fossile fuel. A similar thermodynamic cycle is used in recently developed cryogenic refrigerators where extremely low temperature levels are required, for example, temperature levels approaching absolute zero.

To efficiently utilize these thermodynamic processes, regenerators are necessary to capture and return to the process heat which would otherwise be lost. Without efficient regeneration, the engines and refrigerators here under consideration may not be economically operated.

Characteristically, regenerators of the prior art employ tubes in heat exchange relation to each other, concentric cylinders, stacked screens, or wool-like material enclosed in a regenerating cylinder and even small metallic balls tightly packed into a regenerating cylinder. Thus, a tortuous path is provided for the moving fluid. In operation, the mentioned prior art regenerators absorb heat from the moving fluid as it moves from a hot cylinder to an expansion or cold cylinder and, alternately, returns that heat to the moving fluid as the process reverses and the fluid moves from the expansion or cold cylinder to the hot cylinder. The physical as well as thermodynamic characteristics of each regenerator are largely determined by the specific design characteristics of the device to which it is adapted. Frequently, to achieve optimum efficiency, the physical characteristics of a specific regenerator must be experimentally altered as each new device is constructed.

With the above in mind, it is a primary object of the invention to provide a regenerator structure of simple construction that may be easily sized to provide maximum efficiency in each specific device to which it is adapted.

It is a further object of the invention to provide a regenerator structure of unique design that will economically contribute to low cost production of engines and refrigerators of the type here under consideration.

These and other objects of the invention will become apparent in the course of the following description and from an examination of the related drawings wherein.

Figure 1:
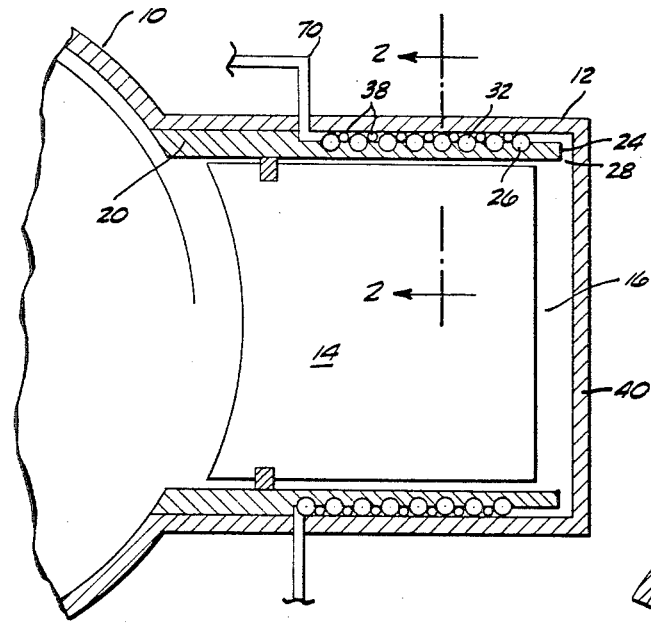
FIGURE 1 is a fragmentary side elevational view, in vertical section, of one embodiment of the invention.
Figure 2:
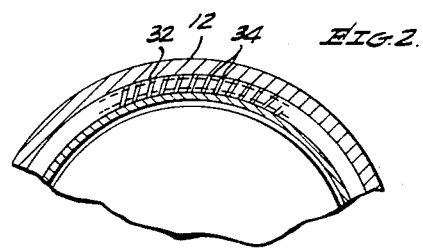
FIG. 2 is a sectional view taken along line 2—2 of FIG. 1.

Describing the invention in detail and directing attention to the figures, an example of a heat engine of the type here under consideration is indicated generally at 10 and comprises a hot cylinder 12 having a piston 14 disposed therein. The piston reciprocates within a hot chamber 16 defined by the cylinder 12. The piston 14 is provided with an annular seal as at 18 as in conventional construction.

The cylinder 12 comprises an inner annular cylindrical element, i.e., a mandrel, here designated by the numeral 20. The mandrel 20, at its forward aspect, is step-machined to provide an annular segment 24 having a groove 26 spirally formed in its outer periphery. The mandrel 20 terminates at an open end 28 and partially defines the hot chamber 16 in which the piston 14 reciprocates.

Figure 4:
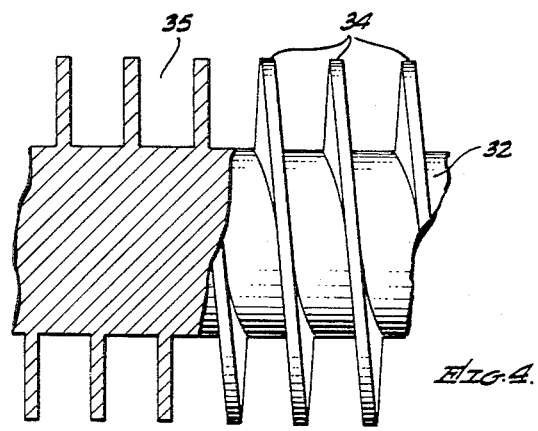
FIG. 4 is a fragmentary view of the finned rod structure employed in the invention.

Directing attention to FIG. 4, an elongated rod 32 is provided having a spiral fin construction 34 disposed annularly about the rod 32. While the rod 32 is shown to be solid in cross-section, however, it will be apparent that hollow tubing may be employed if desired.

In the preferred embodiment of the invention shown in FIG. 1, the finned rod 32 is spirally wound about the segment 22 of the mandrel 20 and disposed within the spiral groove 26 formed therein. In this construction the fins 34 of the rod 32 project substantially above the surface of the mandrel segment 22. A filler element 38, which may be a wire-like material, is disposed in the space between adjacent segments of the rod 32 to overlie the surface of the mandrel segment 22. A cylinder cap indicated generally at 40 is snugly fitted over the rod 32 and filler wire 38. The cap 40 thus closes the hot cylinder 16 and defines with the mandrel element 22 an annular space 39 surrounding the mandrel element 22 and communicating at 28 with the hot cylinder 16.

Figure 3:
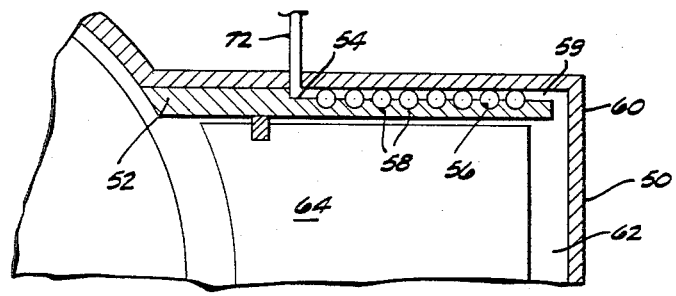
FIG. 3 is a fragmentary, vertical sectional view similar to FIG. 1 of a modification of the invention.

In the alternate embodiment shown in FIG. 3, the hot cylinder is indicated generally at and again comprises an inner mandrel 52 having a stepped machined segment 54 at the forward aspect thereof. Again, an annular spiral groove 56 is formed in its peripheral surface. A finned rod, as shown in FIG. 4, is indicated by the numeral 58 and is again disposed in the spiral grooves 56 formed in the mandrel element 54. However, the spaces intermediate adjacent segments of the finned rod 58 positioned in the spirals 56 are left open in this embodiment. Again, a cylinder cap 60 is fitted over the tubing 58 to close the hot cylinder 50 and define the hot chamber 62 formed therein. A piston 64 is arranged for reciprocating motion with the chamber 62. The cylinder cap 60 as in the prior embodiment defines an annular space 59 with the material segment 54, such space being partially filled by the spirally disposed finned rod 58.

In operation, and directing attention to FIG. 1, as the piston 14 moves to top-dead-center within the cylinder 12, the fluid within the chamber 16 is forced through annular opening 28 and into the space 39 between the cap 40 and the mandrel segment 62. The hot fluid escaping from the chamber 16 is forced through the passage 35 defined by the fins 34 (FIG. 4) spirally wound on rod 32. Thus, the fluid in traveling through the passage 35 moves spirally around the long axis of rod 32 and mandrel segment 24 to a regenerator port 70. Alternately, as the piston 14 is moved toward bottom-dead-center, fluid flow is reversed and moves via port 70 into the spiral passage 35 defined by finned rod 32 and spirally around mandrel segment 24 and into chamber 16 via annular opening 28.

The circulation of the fluid in the embodiment of FIG. 3 is again through space 59, in that, as piston 64 moves to top-dead-center, the fluid is forced from chamber 62 to exit port 72. Alternately, as the piston 64 moves to bottom-dead-center, fluid moves from port 72 into chamber 62. However, fluid flow in the embodiment of FIG. 3 is not restricted to a tortuous spiral path around mandrel segment 54. The fluid in this embodiment may move directly through and over the openings 35 defined by the fins 34 on the rod 32 in view of the fact that the spaces between adjacent elements of rod 58 are not closed as in the earlier embodiment.

It will be apparent to those familiar with the device of the type here under consideration that, in either embodiment, as the fluid moves from the hot chamber 16 or 62 to the ports 70 or 72, it moves in heat exchange relation with the finned rod 32 or 58, respectively. As a result of such flow, in one direction the fluid gives up its heat to the finned rod. As the cycle is reversed and fluid enters port 70 or 72 in a comparatively cool condition, it absorbs heat from the finned rod 32 or 58 as it travels thereover and moves to the chamber 16 or 32 respectively.

In view of the fact that substantial temperature variation is involved as the thermodynamic cycle or process is repetitively undertaken, it is desirable to form the mandrel 20, cylinder cap 40 and spiral tubing 32 of identical metallic material or materials having similar coefficients of expansion and contraction. For example, efficient regenerator construction may be provided where the various parts are formed of stainless steel. However, other materials may be adapted to a particular design.

As noted, a regenerator structure is here provided of simple design that lends itself to economical production of devices employing thermodynamic processes utilizing regeneration. It will be apparent that the regenerating capacity of each device may easily be varied during production by simply altering the physical size of the finned rod positioned over the mandrel segment of the hot cylinder. Thus, production devices having uniform operating characteristics may be economically produced in a simple and facile manner.

The invention as shown is by way of illustration and not limitation and may be modified in many respects, all within the scope and spirit thereof.

What is claimed is:

1. In a regenerator structure for use in a thermodynamic process involving cyclic circulation of a thermodynamic fluid,
a hot cylinder having a piston movable therein to induce said circulation,
said cylinder comprising a cylindrical mandrel element and a cap element defining with the piston a hot chamber within the cylinder,
said elements defining an annular space therebetween, said space being located externally of the chamber,
means establishing communication between the space and the chamber,
a fluid port communicating with the space,
regenerating means disposed within said space,
said regenerating means comprising elongated rod means spirally arranged in said space to form an annular passage peripherally around said cylinder for the circulation of said fluid,
said rod means being provided with spiral fin means projecting outwardly from the axis of the rod means,
spiral groove means in said mandrel element receiving the fin means of said rod means,
said regenerating means being operable to capture and return heat to said fluid during said cyclic circulation.

2. A regenerator structure according to claim 1,
and including barrier means separating the spiral rod means.

3. A regenerator structure according to claim 2,
wherein the cap element is fitted to overlie said fin means and telescopically receive said mandrel element,
said barrier means providing a seal between the elements.

4. In a regenerator structure for use in a thermodynamic process involving the cyclic circulation of a thermodynamic fluid,
a hot cylinder comprising an inner annular cylindrical mandrel element,
a cap element telescopically receiving the mandrel element and defining therewith an annular space around the cylinder,
piston means within the cylinder to induce circulation of said fluid,
said piston means, mandrel and cap elements defining a hot chamber communicating with said space,
port means communicating with said space,
and regenerating means deposited in said space annularly around said mandrel element and defining a passage pattern spirally disposed in said space for the circulation of the fluid and operative to capture and return heat to fluid moving through said space during said cyclic circulation of the fluid.

5. A regenerator structure according to claim 4,
wherein said regenerator means comprises an elongated spirally-finned rod.

6. A regenerator structure according to claim 5,
and including barrier means interposed between the spirals of said rod to thereby limit circulation of said fluid to the passage pattern defined by said spiral fins on said rod.

References Cited

UNITED STATES PATENTS 2,468,293  4/1949  Du Pre _____ 60—24 X

FOREIGN PATENTS 724,983  2/1955  Great Britain.

EDGAR W. GEOGHEGAN, *Primary Examiner.*

C. B. DORITY, *Examiner.*